US010971067B1

(12) United States Patent
Kawashima et al.

(10) Patent No.: US 10,971,067 B1
(45) Date of Patent: Apr. 6, 2021

(54) AMOLED PIXEL DRIVING CIRCUIT, DRIVING METHOD AND TERMINAL

(71) Applicant: Wuhan China Star Optoelectronics Semiconductor Display Technology Co., Ltd., Hubei (CN)

(72) Inventors: Shingo Kawashima, Hubei (CN); Jun Li, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 406 days.

(21) Appl. No.: 16/091,034

(22) PCT Filed: Sep. 13, 2018

(86) PCT No.: PCT/CN2018/105580
§ 371 (c)(1),
(2) Date: Oct. 3, 2018

(87) PCT Pub. No.: WO2019/184266
PCT Pub. Date: Oct. 3, 2019

(30) Foreign Application Priority Data

Mar. 29, 2018 (CN) ......................... 201810272415.2

(51) Int. Cl.
*G09G 3/3291* (2016.01)
*G09G 3/3233* (2016.01)
(Continued)

(52) U.S. Cl.
CPC ......... *G09G 3/3258* (2013.01); *G09G 3/2092* (2013.01); *G09G 3/3266* (2013.01); *G09G 3/3291* (2013.01)

(58) Field of Classification Search
CPC .. G09G 3/3258; G09G 3/2092; G09G 3/3291; G09G 3/3266; G09G 2310/0283;
(Continued)

(56) References Cited

U.S. PATENT DOCUMENTS

2014/0118231 A1* 5/2014 Yang .................... G09G 3/3258 345/82
2014/0152191 A1* 6/2014 Yang .................... G09G 3/3233 315/240
(Continued)

FOREIGN PATENT DOCUMENTS

CN 102708819 A 10/2012
CN 102903333 A 1/2013
(Continued)

*Primary Examiner* — Md Saiful A Siddiqui
(74) *Attorney, Agent, or Firm* — Leong C. Lei

(57) ABSTRACT

The invention provides an AMOLED pixel driving circuit, driving method and terminal. The AMOLED pixel driving circuit adopts a 6T1C structure, comprising a first TFT, i.e., driving TFT, a second TFT, a third TFT, a fourth TFT, a fifth TFT, a sixth TFT, a storage capacitor and an OLED; the scan signal, the first light-emitting control signal and the second light-emitting control signal are combined to successively correspond to a reset phase, a compensation phase and a light-emitting phase, so that the driving current flowing through the OLED is independent of the threshold voltage of the driving TFT and the positive power voltage. The invention compensates for the threshold voltage drift of the driving TFT and also for the voltage drop in positive power voltage.

9 Claims, 8 Drawing Sheets

(51) Int. Cl.
*G09G 3/3258* (2016.01)
*G06F 3/041* (2006.01)
*G09G 3/20* (2006.01)
*G09G 3/3266* (2016.01)

(58) Field of Classification Search
CPC ..... G09G 2320/0693; G09G 2310/062; G09G 2320/0233
See application file for complete search history.

(56) References Cited

U.S. PATENT DOCUMENTS

| | | | | |
|---|---|---|---|---|
| 2016/0062522 | A1* | 3/2016 | Yang | G09G 3/3291 345/174 |
| 2016/0063922 | A1 | 3/2016 | Tsai et al. | |
| 2017/0147121 | A1* | 5/2017 | Yang | H01L 27/3246 |
| 2018/0374417 | A1* | 12/2018 | Yang | G09G 3/3233 |
| 2019/0035330 | A1* | 1/2019 | Li | H01L 27/3276 |

FOREIGN PATENT DOCUMENTS

| | | | | |
|---|---|---|---|---|
| CN | 103021331 | A | 4/2013 | |
| CN | 104898887 | A | 9/2015 | |
| CN | 105632408 | A | 6/2016 | |
| CN | 107437399 | * | 12/2017 | G06F 3/041 |
| CN | 107437399 | A | 12/2017 | |
| CN | 108231005 | A | 6/2018 | |

* cited by examiner

AMOLED PIXEL DRIVING CIRCUIT, DRIVING METHOD AND TERMINAL

RELATED APPLICATIONS

The present application is a National Phase of International Application Number PCT/CN2018/105580, filed Sep. 13, 2018, and claims the priority of China Application No. 201810272415.2, filed Mar. 29, 2018.

BACKGROUND OF THE INVENTION

1. Field of the Invention

The present invention relates to the field of display, and in particular to an active matrix organic light-emitting diode (AMOLED) pixel driving circuit, driving method and terminal.

2. The Related Arts

The organic light-emitting diode (OLED) display panel, having advantages of active luminous, low driving voltage, high luminous efficiency, short response time, high definition and contrast ratio, near 180° viewing angle, wide operating temperature range, ability to realize of flexible display and large-area full-color display, is recognized by the industry as the most promising display device.

The OLED can be divided into passive matrix (PM) OLED and active matrix (AM) OLED according to the driving mode, i.e., direct addressing and thin film transistor (TFT) matrix addressing.

The AMOLED display panel has a plurality of pixels arranged in an array, and each pixel is driven by an OLED pixel driving circuit.

As shown in FIG. 1, the known AMOLED pixel driving circuit is a 2T1C structure, comprising: a switching TFT T100, a driving TFT T200, and a storage capacitor C100. The switching TFT T100 and the driving TFT T200 are both N-type TFTs. The driving current of the OLED D100 is controlled by the driving TFT T200. The known calculation formula for the driving current is:

$$I_{OLED}=K\times(V_{gs}-V_{th})^2$$

Wherein $I_{OLED}$ represents the driving current, K is the current amplification factor of the driving TFT T200, which is determined by the electrical characteristics of the driving TFT T200, $V_{gs}$ represents the voltage difference between the gate and the source of the driving TFT T200, and $V_{th}$ represents the threshold voltage of the driving TFT T200. As shown, the driving current $I_{OLED}$ is related to the threshold voltage V of the driving TFT T200.

Since the threshold voltage $V_{th}$ of the driving TFT T200 is easy to drift, the driving current $I_{OLED}$ may change, which may cause uneven brightness of the AMOLED display panel, resulting in display defects and affecting image quality.

Since the known 2T1C AMOLED pixel driving circuit does not have the function for compensating the threshold voltage of the driving TFT, each display manufacturer proposes a plurality of pixel driving circuits capable of compensating the threshold voltage of the driving TFT. Referring to FIG. 2, a conventional AMOLED pixel driving circuit of 6T1C structure with a function of compensating a threshold voltage of a driving TFT comprises a first P-type TFT T10, i.e., a driving TFT, a second P-type TFT T20, a third P-type TFT T30, a fourth P-type TFT T40, a fifth P-type TFT T50, a sixth P-type TFT T60, a storage capacitor C10 and an OLED D10. Combined with the timing diagram in FIG. 3, the specific operation process of the 6T1C AMOLED pixel driving circuit is as follows:

Reset phase S10: the previous scan signal Scan(n−1) is at a low level, the scan signal Scan(n) and the light-emitting control signal EM are both at a high level, and the gate g' of the first P-type TFT T10 is reset to the lower level VI through the conduction of the fourth P-type TFT T40.

Data signal writing and threshold voltage compensation phase S20: the scan signal Scan(n) is at a low level, the previous scan signal Scan(n−1) and the light-emitting control signal EM are both at a high level, and the gate g' and the drain d' of the first P-type TFT T10 are shorted by the conduction of the second P-type TFT T20 to form a diode structure, and the data signal Data is written into the source s' of the first P-type TFT T10 through the conducted third P-type TFT T30, and uses the diode structure to charge the voltage $V_{g'}$ of the gate g' of the first P-type TFT T10 to $V_{data}-|V_{th}|$, where $V_{data}$ represents the data signal Data. The voltage $V_{th}$ represents the threshold voltage of the first P-type TFT T10.

Light-emitting phase S30: only the light-emitting control signal EM is at a low level, the fifth P-type TFT T50 and the sixth P-typeTFT T60 are conductive, and the driving current flows from the first P-type TFT T10 into the OLED D10 and drives the OLED D10 to emit light. The driving current is calculated as:

$$\begin{aligned} I_{OLED} &= K\times(V_{s'}-V_{g'}-|V_{th}|)^2 \\ &= K\times(VDD-(V_{data}-|V_{th}|)-|V_{th}|)^2 \\ &= K\times(VDD-V_{data})^2 \end{aligned}$$

Wherein $I_{OLED}$ represents the driving current, K is a current amplification factor of the first P-type TFT T10, i.e., the driving TFT, $V_{s'}$ represents a source voltage of the first P-type TFT T10, and $V_{g'}$ represents a gate voltage of the first P-type TFT T10, VDD represents the positive power supply voltage VDD.

As seen, the driving current $I_{OLED}$ is independent of the threshold voltage $V_{th}$ of the first P-type TFT T10. This structure can eliminate the problem that the threshold voltage drift of the first P-type T T10, i.e., the driving TFT, causes the AMOLED screen to display poorly.

However, the above 6T1C structure AMOLED pixel driving circuit still has a deficiency: the driving current is also related to the positive voltage VDD of the power supply. Because there is a voltage drop in the positive voltage VDD of the power supply, which will seriously affect the driving current, the AMOLED pixel driving circuit of the 6T1C structure cannot compensate the voltage drop in the positive voltage VDD of the power supply.

SUMMARY OF THE INVENTION

The object of the present invention is to provide an AMOLED pixel driving circuit capable of compensating a threshold voltage drift of a driving TFT and compensating for a voltage drop in a positive voltage of a power supply, thereby eliminating the impact of threshold voltage drift of a driving TFT and voltage drop in positive power supply voltage on the driving current as well as improving the display quality of the AMOLED.

Another object of the present invention is to provide an AMOLED pixel driving method capable of eliminating the impact of threshold voltage drift of a driving TFT and voltage drop in positive power supply voltage on the driving current as well as improving the display quality of the AMOLED.

Yet another object of the present invention is to provide a terminal, having a pixel driving circuit capable of compensating a threshold voltage drift of a driving TFT and compensating for a voltage drop in a positive voltage of a power supply, thereby eliminating the impact of threshold voltage drift of a driving TFT and voltage drop in positive power supply voltage on the driving current as well as improving the display quality.

To achieve the above object, the present invention provides an AMOLED pixel driving circuit, which comprises: a first thin film transistor (TFT), a second TFT, a third TFT, a fourth TFT, a fifth TFT, a sixth TFT, a storage capacitor, and an organic light-emitting diode (OLED), wherein the first TFT being a driving TFT;

the first TFT having a gate electrically connected to a first node, a source electrically connected to a second node, and a drain electrically connected to a third node;

the second TFT having a gate receiving a second light-emitting control signal, a source receiving a positive power voltage, and a drain electrically connected to the second node;

the third TFT having a gate receiving a scan signal, a source receiving a reference voltage, and a drain electrically connected to a fourth node;

the fourth TFT having a gate receiving the scan signal, a source receiving a data signal, and a drain electrically connected to the first node;

the fifth TFT having a gate receiving a first light-emitting control signal, a source electrically connected to the fourth node, and a drain electrically connected to the first node;

the sixth TFT having a gate receiving the scan signal, a source receiving a low voltage, and a drain electrically connected to the third node;

the storage capacitor having one end electrically connected to the fourth node and the other electrically connected to the second node;

the OLED having an anode connected to the third node and a cathode receiving a negative power voltage;

the AMOLED pixel driving circuit having a reset phase, a compensation phase and a light-emitting phase;

when the AMOLED pixel driving circuit being in a reset phase, the second TFT, the third TFT, and the fourth TFT and the sixth TFT being turned on, and the fifth TFT being turned off; when the AMOLED pixel driving circuit being in the compensation phase, the third TFT, the fourth TFT, and the sixth TFT being turned on, the second TFT and the fifth TFT being turned off; when the AMOLED pixel driving circuit is in the light-emitting phase, the second TFT and the fifth TFT being turned on, the third TFT, the fourth TFT and the sixth TFT being turned off.

Optionally, each TFT is a P-type TFT; during the reset phase, the scan signal and the second light-emitting control signal are at low voltage, and the first light-emitting control signal is at high voltage; during the compensation phase, the scan signal is at low voltage, and the first light-emitting control signal and the second light-emitting control signal are at high voltage; during the light-emitting phase, the scan signal is at high voltage, and the first light-emitting control signal and the second light-emitting control signal are at low voltage.

Optionally, each TFT is an N-type TFT: during the reset phase, the scan signal and the second light-emitting control signal are at high voltage, and the first light-emitting control signal is at low voltage; during the compensation phase, the scan signal is at high voltage, and the first light-emitting control signal and the second light-emitting control signal are at low voltage; during the light-emitting phase, the scan signal is at low voltage, and the first light-emitting control signal and the second light-emitting control signal are at high voltage.

The first TFT, the second TFT, the third TFT, the fourth TFT, the fifth TFT and the sixth TFT are all low temperature polycrystalline silicon (LTPS) TFTs, oxide semiconductor TFTs, or amorphous silicon (a-Si) TFTs.

The present invention also provides an AMOLED pixel driving method, applicable to the above AMOLED pixel driving circuit, comprising the following steps of:

Step S1: controlling the AMOLED pixel driving circuit to be in a reset phase;

the second TFT, the third TFT, the fourth TFT and the sixth TFT being turned on, and the fifth TFT being turned off;

Step S2: controlling the AMOLED pixel driving circuit to be in a compensation phase;

the third TFT, the fourth TFT and the sixth TFT being turned on, and the second TFT and the fifth TFT being turned off;

Step S3: controlling the AMOLED pixel driving circuit to be in a light-emitting phase;

the second TFT and the fifth TFT being turned on, and the third TFT, the fourth TFT and the sixth TFT being turned off.

Optionally, each TFT is a P-type TFT; the scan signal and the second light-emitting control signal provide a low voltage, and the first light-emitting control signal provides a high voltage to control the AMOLED pixel driving circuit to be in a reset phase; the scan signal provides a low voltage, and the first light-emitting control signal and the second light-emitting control signal provide a high voltage to control the AMOLED pixel driving circuit to be in a compensation phase: the scan signal provides a high voltage, and the first light-emitting control signal and the second light-emitting control signal provide a low voltage to control the AMOLED pixel driving circuit to be in a light-emitting phase.

Optionally, each TFT is n N-type TFT; the scan signal and the second light-emitting control signal provide a high voltage, and the first light-emitting control signal provides a low voltage to control the AMOLED pixel driving circuit to be in a reset phase; the scan signal provides a high voltage, and the first light-emitting control signal and the second light-emitting control signal provide a low voltage to control the AMOLED pixel driving circuit to be in a compensation phase; the scan signal provides a low voltage, and the first light-emitting control signal and the second light-emitting control signal provide a high voltage to control the AMOLED pixel driving circuit to be in a light-emitting phase.

The first TFT, the second TFT, the third TFT, the fourth TFT, the fifth TFT and the sixth TFT are all low temperature polycrystalline silicon (LTPS) TFTs, oxide semiconductor TFTs, or amorphous silicon (a-Si) TFTs.

The present invention also provides a terminal, which comprises the above AMOLED pixel driving circuit.

The present invention provides the following advantages: the AMOLED pixel driving circuit and driving method provided by the present invention adopt a 6T1C structure driving circuit. The scan signal, the first light-emitting control signal and the second light-emitting control signal are combined to successively correspond to a reset phase, a compensation phase and a light-emitting phase, so that the driving current flowing through the OLED is independent of the threshold voltage of the driving TFT and the positive power voltage. The invention not only compensates for the threshold voltage drift of the driving TFT but also for the voltage drop in positive power voltage. Therefore, the invention can eliminate the impact of the threshold voltage drift of the driving TFT and voltage drop in the positive power voltage on the driving current, and the display quality of the AMOLED is improved. A terminal provided by the present invention comprises the AMOLED pixel driving circuit capable of compensating for threshold voltage drift of driving TFT and for voltage drop in positive power voltage, thereby eliminating the impact of threshold voltage drift of a driving TFT and voltage drop in positive power voltage on the drive current and showing a higher display quality.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technical means and effect of the present invention, the following refers to embodiments and drawings for detailed description.

Figure 1:
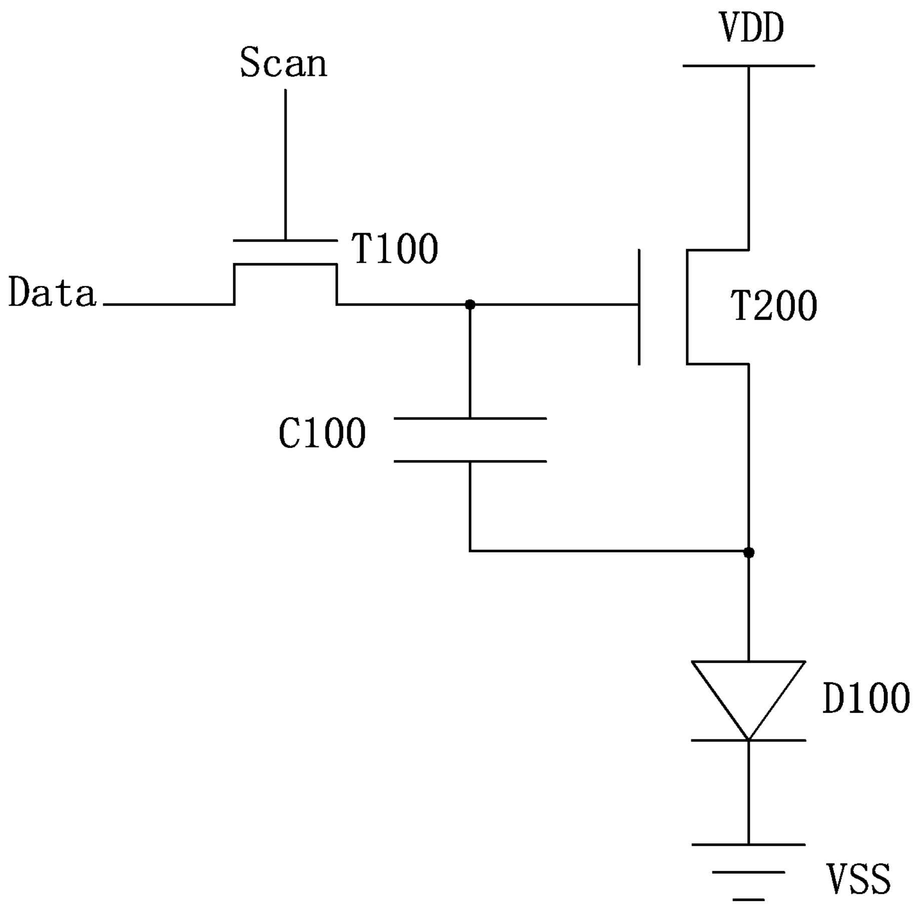
(Prior Art) Fig. 1
FIG. 1 is a schematic view showing the structure of known 2T1C structure AMOLED pixel driving circuit.
Figure 2:
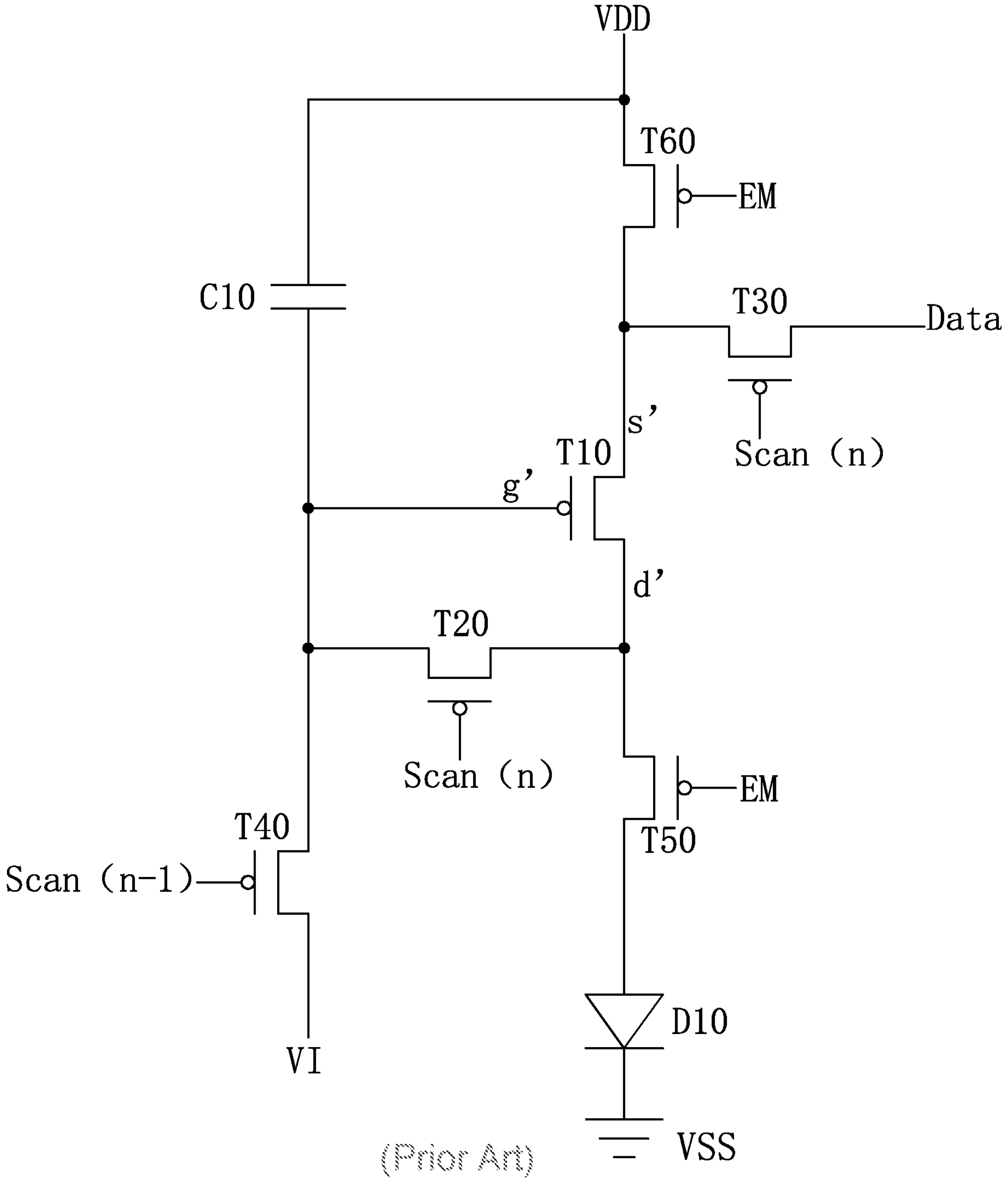
(Prior Art) Fig. 2
FIG. 2 is a schematic view showing the structure of known 6T1C structure AMOLED pixel driving circuit.
Figure 3:
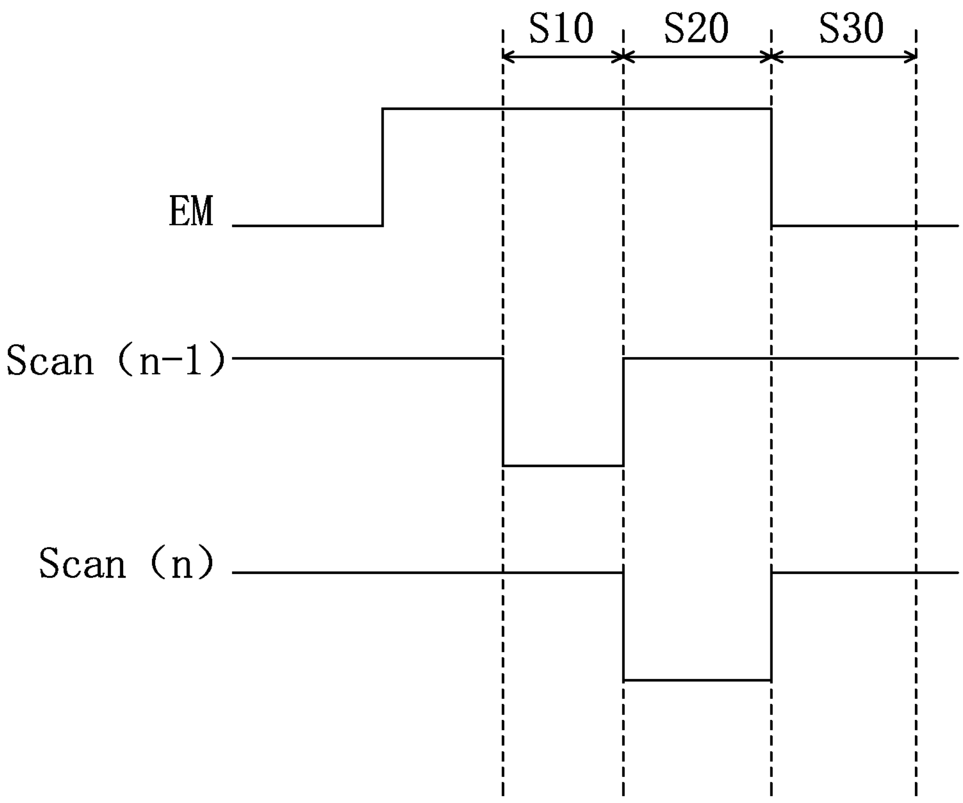
(Prior Art) Fig. 3
FIG. 3 is a schematic view showing the timing of the AMOLED pixel driving circuit in FIG. 2.
Figure 4:
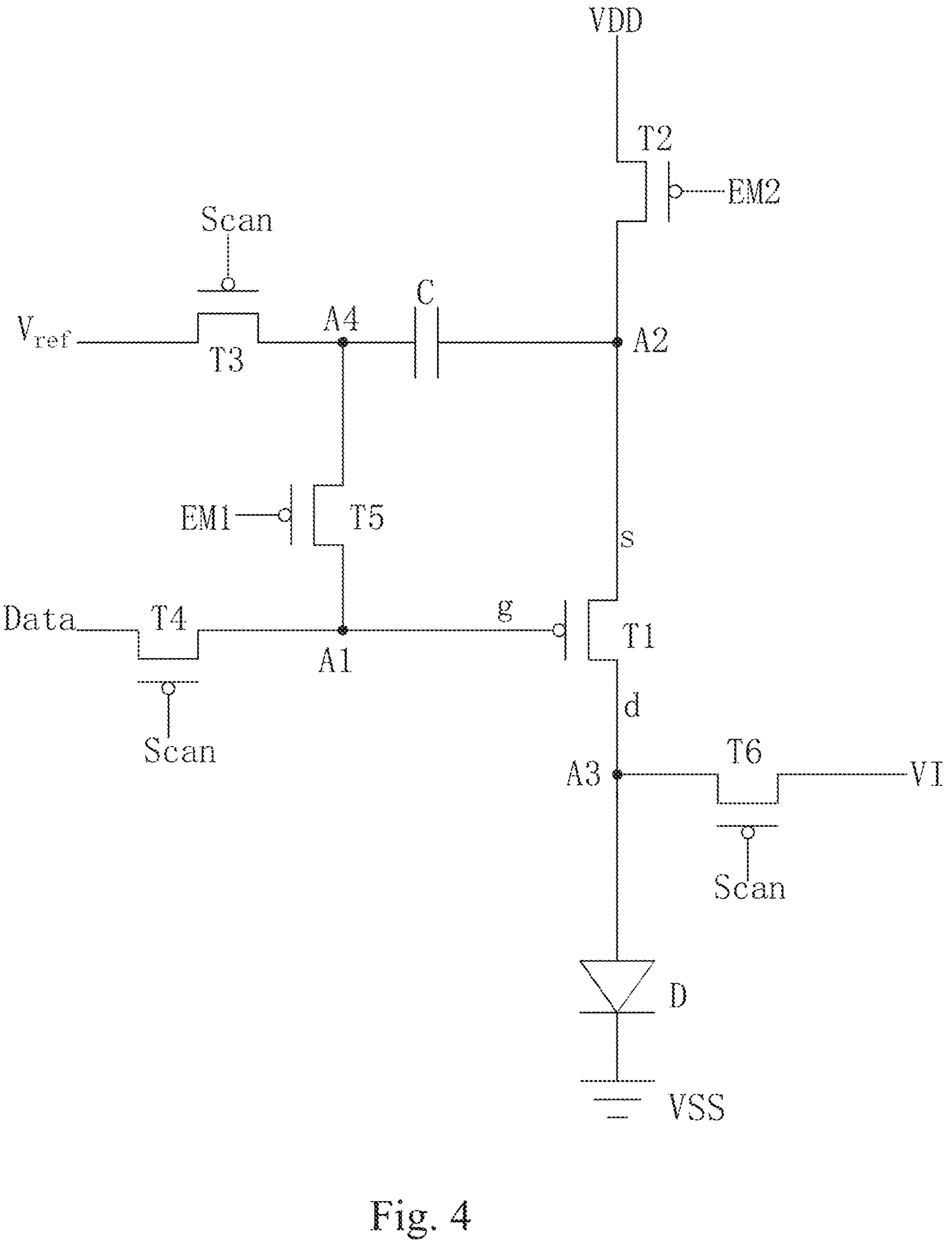
FIG. 4 is a schematic view showing the circuit of the AMOLED pixel driving circuit provided by the embodiment of the present invention.

Refer to FIG. 4. The present invention provides an AMOLED pixel driving circuit. The AMOLED pixel driving circuit is of 6T1C structure, which comprises: a first TFT T1, a second TFT T2, a third TFT T3, a fourth TFT T4, a fifth TFT T5, a sixth TFT T6, a storage capacitor C, and an OLED D, wherein the first TFT T1 is a driving TFT.

The first TFT T1 has a gate g electrically connected to a first node A1, a source s electrically connected to a second node A2, and a drain d electrically connected to a third node A3; the second TFT T2 has a gate receiving a second light-emitting control signal EM2, a source receiving a positive power voltage VDD, and a drain electrically connected to the second node A2; the third TFT T3 has a gate receiving a scan signal Scan, a source receiving a reference voltage $V_{ref}$, and a drain electrically connected to a fourth node A4; the fourth TFT T4 has a gate receiving the scan signal Scan, a source receiving a data signal Data, and a drain electrically connected to the first node A1; the fifth TFT T5 has a gate receiving a first light-emitting control signal EM1, a source electrically connected to the fourth node A4, and a drain electrically connected to the first node A1; the sixth TFT T6 has a gate receiving the scan signal Scan, a source receiving a low voltage VI, and a drain electrically connected to the third node A3; the storage capacitor C has one end electrically connected to the fourth node A4 and the other electrically connected to the second node A2; the OLED D has an anode connected to the third node A3 and a cathode receiving a negative power voltage VSS.

Specifically, the first TFT T1, the second TFT T2, the third TFT T3, the fourth TFT T4, the fifth TFT T5, and the sixth TFT T6 are all low temperature polycrystalline silicon (LTPS) TFTs, oxide semiconductor TFTs, or amorphous silicon (a-Si) TFTs.

The scan signal Scan, the first light-emitting control signal EM1 and the second light-emitting control signal EM2 are generated by an external timing controller. The scan signal Scan is used to control the turn-on (conduction) or turn-off (cut-off) of the third TFT T3, the fourth TFT T4, and the sixth TFT T6. The first light-emitting control signal EM1 is used to control the turn-on and turn-off of the fifth TFT T5. Turning on or off. The second light-emitting control signal EM2 is used to control the turn-on or turn-off of the second TFT T2.

Figure 5:
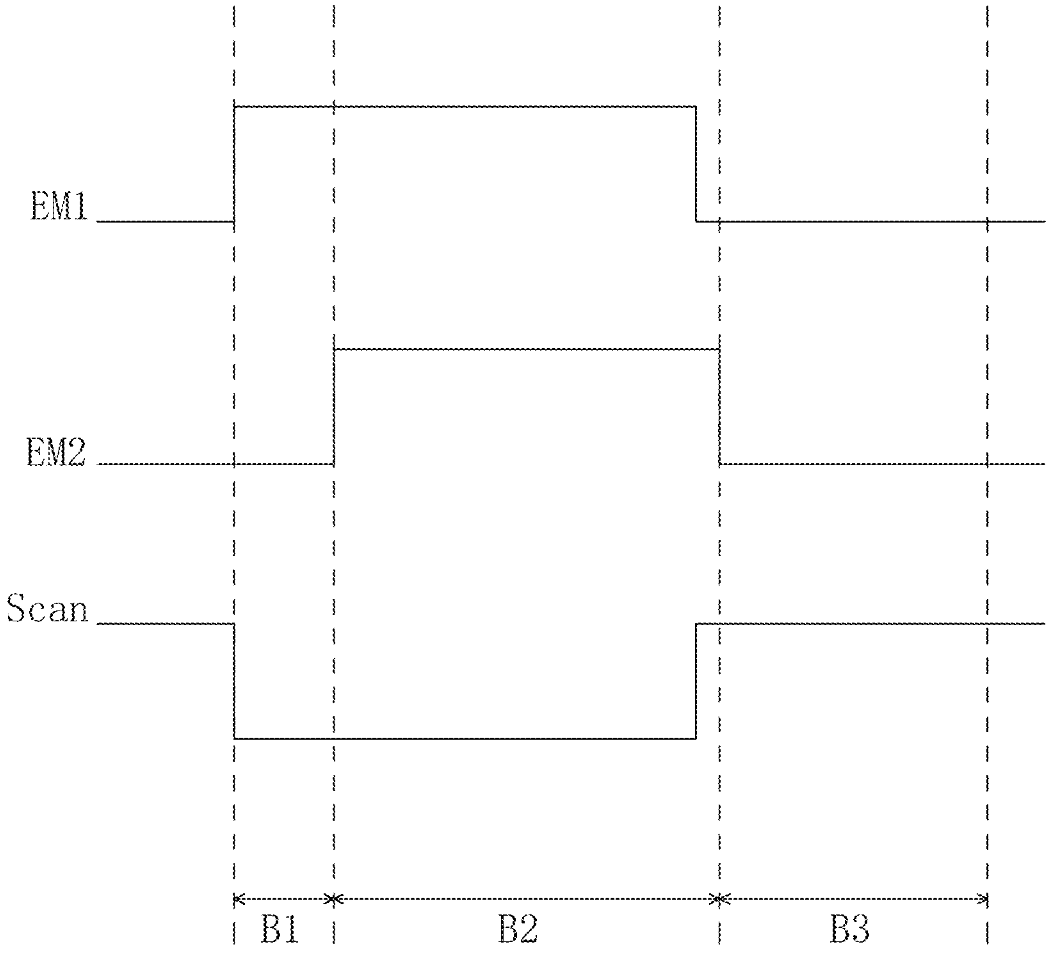
FIG. 5 is a schematic view showing the timing of the AMOLED pixel driving circuit provided by the embodiment of the present invention.

Refer to FIG. 5. The scan signal Scan, the first light-emitting control signal EM1 and the second light-emitting control signal EM2 are combined to successively correspond to a reset phase B1, a compensation phase B2, and a light-emitting phase B3.

Refer to FIG. 4 and FIG. 5:

For example, when the first TFT T1, the second TFT T2, the third TFT T3, the fourth TFT T4, the fifth TFT T5, and the sixth TFT T6 are all P-type TFTs, during the reset phase B1, the scan signal Scan is at low voltage, and the third TFT T3, the fourth TFT T4 and the sixth TFTT6 are all turned on; the second light-emitting control signal EM2 is at low voltage, and the second TFT T2 is turned on; the first light-emitting control signal EM1 is at high voltage, and the fifth TFT T5 is turned off.

The anode of the OLED D is reset to the low voltage VI through the turned-on sixth TFT T6, and one end of the storage capacitor C is reset to the reference voltage $V_{ref}$ through the turned-on third TFT T3. The other end of the capacitor C is reset to the positive power voltage VDD through the turned-on second TFT T2.

Clearly, when the first TFT T1, the second TFT T2, the third TFT T3, the fourth TFT T4, the fifth TFT T5, and the sixth TFT T6 are all N-type TFTs, during the reset phase B1, the scan signal Scan is at high voltage, and the third TFT T3, the fourth TFT T4 and the sixth TFTT6 are all turned on; the second light-emitting control signal EM2 is at high voltage, and the second TFT T2 is turned on; the first light-emitting control signal is at low voltage, and the fifth TFT T5 is turned off.

The anode of the OLED D is reset to the low voltage VI through the turned-on sixth TFT T6, and one end of the storage capacitor C is reset to the reference voltage $V_{ref}$ through the turned-on third TFT T3. The other end of the capacitor C is reset to the positive power voltage VDD through the turned-on second TFT T2.

During the data signal write-in and threshold voltage compensation phase B2:

If the first TFT T1, the second TFT T2, the third TFT T3, the fourth TFT T4, the fifth TFT T5, and the sixth TFT T6 are all P-type TFTs, the scan signal Scan is at low voltage, and the third TFT T3, the fourth TFT T4 and the sixth TFTT6 are all turned on; the first light-emitting control signal EM1 is at high voltage, and the fifth TFT T5 is turned off; the second light-emitting control signal EM2 is at high voltage, and the second TFT T2 is turned off.

The data signal Data is written into the gate g of the first TFT T1 through the turned-on fourth TFT T4. One end of the storage capacitor C is maintained by the turned-on third TFT T3 holding the reference voltage $V_{ref}$, and the voltage of the other end of the storage capacitor C and the source s of the first TFT T1 is lowered from the positive power voltage VDD to:

$$V_s=V_{data}+|V_{th}|$$

Wherein $V_s$ is the voltage level of the other end of the storage capacitor C and the source s of the first TFT T1, $V_{data}$ is the voltage level of the data signal Data, and $V_{th}$ is the threshold voltage of the first TFT T1, i.e., the driving TFT;

The voltage difference between one end and the other end of the storage capacitor C is: $V_{ref}(V_{data}+|V_{th}|)$.

If the first TFT T1, the second TFT T2, the third TFT T3, the fourth TFT T4, the fifth TFT T5, and the sixth TFT T6 are all N-type TFTs, the scan signal Scan is at high voltage, and the third TFT T3, the fourth TFT T4 and the sixth TFTT6 are all turned on; the first light-emitting control signal EM1 is at low voltage, and the fifth TFT T5 is turned off; the second light-emitting control signal EM2 is at low voltage, and the second TFT T2 is turned off.

The data signal Data is written into the gate g of the first TFT T1 through the turned-on fourth TFT T4. One end of the storage capacitor C is maintained by the turned-on third TFT T3 holding the reference voltage $V_{ref}$, and the voltage of the other end of the storage capacitor C and the source s of the first TFT T1 is lowered from the positive power voltage VDD to:

$$V_s=V_{data}-|V_{th}|$$

Wherein $V_s$ is the voltage level of the other end of the storage capacitor C and the source s of the first TFT T1, $V_{data}$ is the voltage level of the data signal Data, and $V_{th}$ is the threshold voltage of the first TFT T1, i.e., the driving TFT;

The voltage difference between one end and the other end of the storage capacitor C is: $V_{ref}-(V_{data}-|V_{th}|)$.

During the light-emitting phase B3:

If the first TFT T1, the second TFT T2, the third TFT T3, the fourth TFT T4, the fifth TFT T5, and the sixth TFT T6 are all P-type TFTs, the scan signal Scan is at high voltage, and the third TFT T3, the fourth TFT T4 and the sixth TFTT6 are all turned off; the first light-emitting control signal EM1 is at low voltage, and the fifth TFT T5 is turned on; the second light-emitting control signal EM2 is at low voltage, and the second TFT T2 is turned on.

As the second TFT T2 is turned on, the voltage level of the other end of the storage capacitor C and the source s of the first TFT T1 becomes a positive power voltage VDD; since the fifth TFT T5 is turned on, one end of the storage capacitor C and the gate g of the first TFT T1 are shorted. As such, the voltage level of one end of the storage capacitor C and the gate g of the first TFT T1 becomes:

$$V_g=VDD+(V_{ref}-(V_{data}+|V_{th}|))=VDD+V_{ref}-V_{data}-|V_{th}|$$

Wherein, $V_g$ is the voltage level of the gate g of the first TFT T1, VDD is the positive power voltage, and $V_{ref}$ is the reference voltage;

The driving current flows through the OLED D to drive the OLED D to emit light, and the driving current is:

$$\begin{aligned} I_{OLED} &= K\times(V_s-V_g-|V_{th}|)^2 \\ &= K\times(VDD-(VDD+V_{ref}-V_{data}-|V_{th}|)-|V_{th}|)^2 \\ &= K\times(V_{data}-V_{ref})^2 \end{aligned}$$

Wherein, $I_{OLED}$ is the driving current, and K is a current amplification factor of the first TFT T1, i.e., driving TFT, and is determined by the electrical characteristics of the driving TFT.

If the first TFT T1, the second TFT T2, the third TFT T3, the fourth TFT T4, the fifth TFT T5, and the sixth TFT T6 are all N-type TFTs, the scan signal Scan is at low voltage, and the third TFT T3, the fourth TFT T4 and the sixth TFTT6 are all turned off; the first light-emitting control signal EM1 is at high voltage, and the fifth TFT T5 is turned on; the second light-emitting control signal EM2 is at high voltage, and the second TFT T2 is turned on.

As the second TFT T2 is turned on, the voltage level of the other end of the storage capacitor C and the source s of the first TFT T1 becomes a positive power voltage VDD; since the fifth TFT T5 is turned on, one end of the storage capacitor C and the gate g of the first TFT T1 are shorted. As such, the voltage level of one end of the storage capacitor C and the gate g of the first TFT T1 becomes:

$$V_g=VDD+(V_{ref}-(V_{data}-|V_{th}|))=VDD+V_{ref}-V_{data}+|V_{th}|$$

Wherein, $V_g$ is the voltage level of the gate g of the first TFT T1, VDD is the positive power voltage, and $V_{ref}$ is the reference voltage;

The driving current flows through the OLED D to drive the OLED D to emit light, and the driving current is:

$$\begin{aligned} I_{OLED} &= K\times(V_s-V_g-|V_{th}|)^2 \\ &= K\times(VDD+V_{ref}-V_{data}+|V_{th}|)-VDD-|V_{th}|)^2 \\ &= K\times(V_{data}-V_{ref})^2 \end{aligned}$$

Wherein, $I_{OLED}$ is the driving current, and K is a current amplification factor of the first TFT T1, i.e., driving TFT, and is determined by the electrical characteristics of the driving TFT.

Therefore, the driving current $I_{OLED}$ is independent of the threshold voltage $V_{th}$ of the first TFT T1, i.e., driving TFT, and the positive power voltage VDD, so the AMOLED pixel driving circuit of the present invention can compensate for the threshold voltage $V_{th}$ drift of the driving TFT. In addition, the voltage drop in the positive power voltage VDD can also be compensated, so that the impact of the threshold voltage $V_{th}$ drift of the driving TFT and the voltage drop in the positive power voltage VDD on the driving current $I_{OLED}$ can be eliminated, and the display quality of the AMOLED can be improved.

The present invention also provides an AMOLED pixel driving method, applicable to the above AMOLED pixel driving circuit, comprising the following steps of:

Step S1: controlling the AMOLED pixel driving circuit to be in a reset phase B1.

Figure 6:
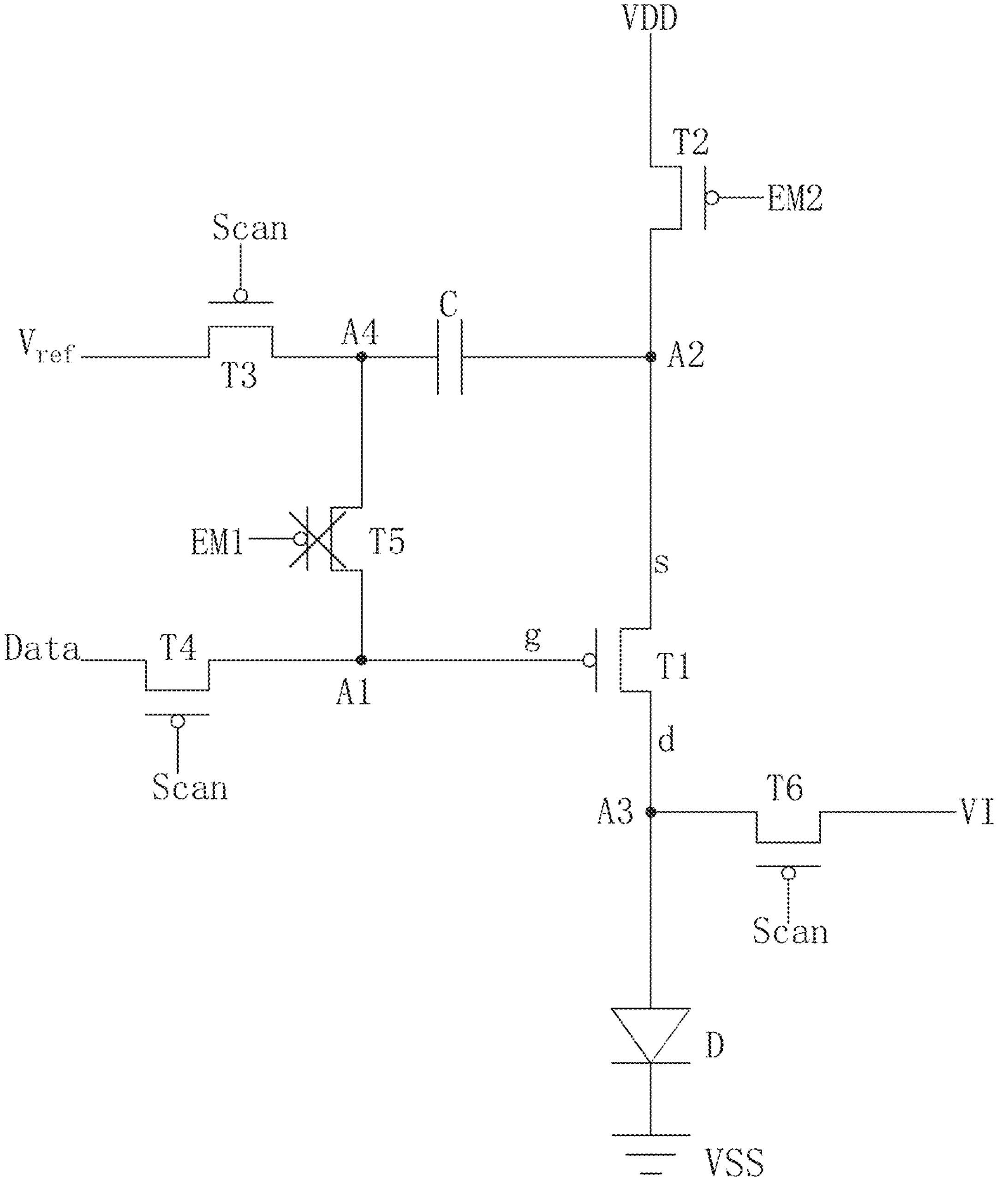
FIG. 6 is a schematic view showing step S1 of the AMOLED pixel driving method provided by the embodiment of the present invention.

Refer to FIG. 5 and FIG. 6.

For example, when the first TFT T1, the second TFT T2, the third TFT T3, the fourth TFT T4, the fifth TFT T5, and the sixth TFT T6 are all P-type TFTs:

the scan signal Scan and the second light-emitting control signal EM2 provide a low voltage, and the first light-emitting control signal EM1 provides a high voltage to control the AMOLED pixel driving circuit to be in a reset phase B1; the second TFT T2, the third TFT T3, the fourth TFT T4 and the sixth TFTT6 are all turned on; and the fifth TFT T5 is turned off.

The anode of the OLED D is reset to the low voltage VI through the turned-on sixth TFT T6, and one end of the storage capacitor C is reset to the reference voltage $V_{ref}$ through the turned-on third TFT T3. The other end of the capacitor C is reset to the positive power voltage VDD through the turned-on second TFT T2.

Clearly, the first TFT T1, the second TFT T2, the third TFT T3, the fourth TFT T4, the fifth TFT T5, and the sixth TFT T6 can all be N-type TFTs. Then, during the reset phase B1, the scan signal Scan and the second light-emitting control signal EM2 provide a high voltage, and the first light-emitting control signal EM1 provides a low voltage to control the AMOLED pixel driving circuit to be in a reset phase B1; the second TFT T2, the third TFT T3, the fourth TFT T4 and the sixth TFTT6 are all turned on; and the fifth TFT T5 is turned off.

The anode of the OLED D is reset to the low voltage VI through the turned-on sixth TFT T6, and one end of the storage capacitor C is reset to the reference voltage $V_{ref}$ through the turned-on third TFT T3. The other end of the capacitor C is reset to the positive power voltage VDD through the turned-on second TFT T2.

Step S2: controlling the AMOLED pixel driving circuit to be in a compensation phase B2.

Figure 7:
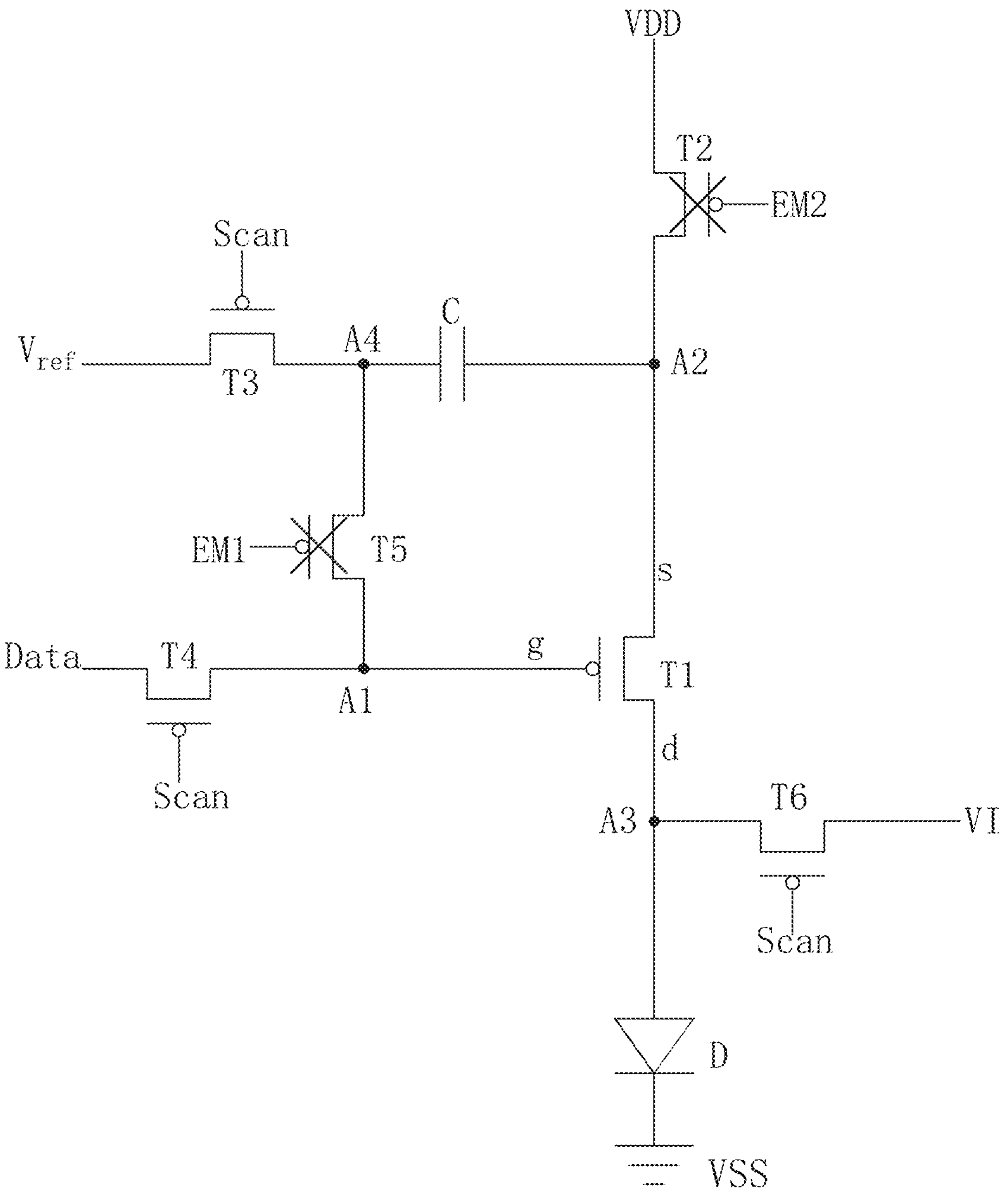
FIG. 7 is a schematic view showing step S2 of the AMOLED pixel driving method provided by the embodiment of the present invention.

Refer to FIG. 5 and FIG. 7. If the first TFT T1, the second TFT T2, the third TFT T3, the fourth TFT T4, the fifth TFT T5, and the sixth TFT T6 are all P-type TFTs, the scan signal Scan provides a low voltage, and the first light-emitting control signal EM1 and the second light-emitting control signal EM2 provide a high voltage to control the AMOLED pixel driving circuit to be in a compensation phase; the third TFT T3, the fourth TFT T4 and the sixth TFT T6 are turned on, and the second TFT T2 and the fifth TFT T5 turned off.

The data signal Data is written into the gate g of the first TFT T1 through the turned-on fourth TFT T4. One end of the storage capacitor C is maintained by the turned-on third TFT T3 holding the reference voltage $V_{ref}$, and the voltage of the other end of the storage capacitor C and the source s of the first TFT T1 is lowered from the positive power voltage VDD to:

$$V_s = V_{data} + |V_{th}|$$

Wherein $V_s$ is the voltage level of the other end of the storage capacitor C and the source s of the first TFT T1, $V_{data}$ is the voltage level of the data signal Data, and $V_{th}$ is the threshold voltage of the first TFT T1, i.e., the driving TFT;

The voltage difference between one end and the other end of the storage capacitor C is: $V_{ref} - (V_{data} + |V_{th}|)$.

If the first TFT T1, the second TFT T2, the third TFT T3, the fourth TFT T4, the fifth TFT T5, and the sixth TFT T6 are all N-type TFTs, the scan signal Scan provides a high voltage, and the first light-emitting control signal EM1 and the second light-emitting control signal EM2 provide a low voltage to control the AMOLED pixel driving circuit to be in a compensation phase; the third TFT T3, the fourth TFT T4 and the sixth TFTT6 are all turned on; the second TFT T2 and the fifth TFT T5 are turned off.

The data signal Data is written into the gate g of the first TFT T1 through the turned-on fourth TFT T4. One end of the storage capacitor C is maintained by the turned-on third TFT T3 holding the reference voltage $V_{ref}$, and the voltage of the other end of the storage capacitor C and the source s of the first TFT T1 is lowered from the positive power voltage VDD to:

$$V_s = V_{data} - |V_{th}|$$

Wherein $V_s$ is the voltage level of the other end of the storage capacitor C and the source s of the first TFT T1, $V_{data}$ is the voltage level of the data signal Data, and $V_{th}$ is the threshold voltage of the first TFT T1, i.e., the driving TFT;

The voltage difference between one end and the other end of the storage capacitor C is: $V_{ref} - (V_{data} - |V_{th}|)$.

Step S3: controlling the AMOLED pixel driving circuit to be in a light-emitting phase B3.

Figure 8:
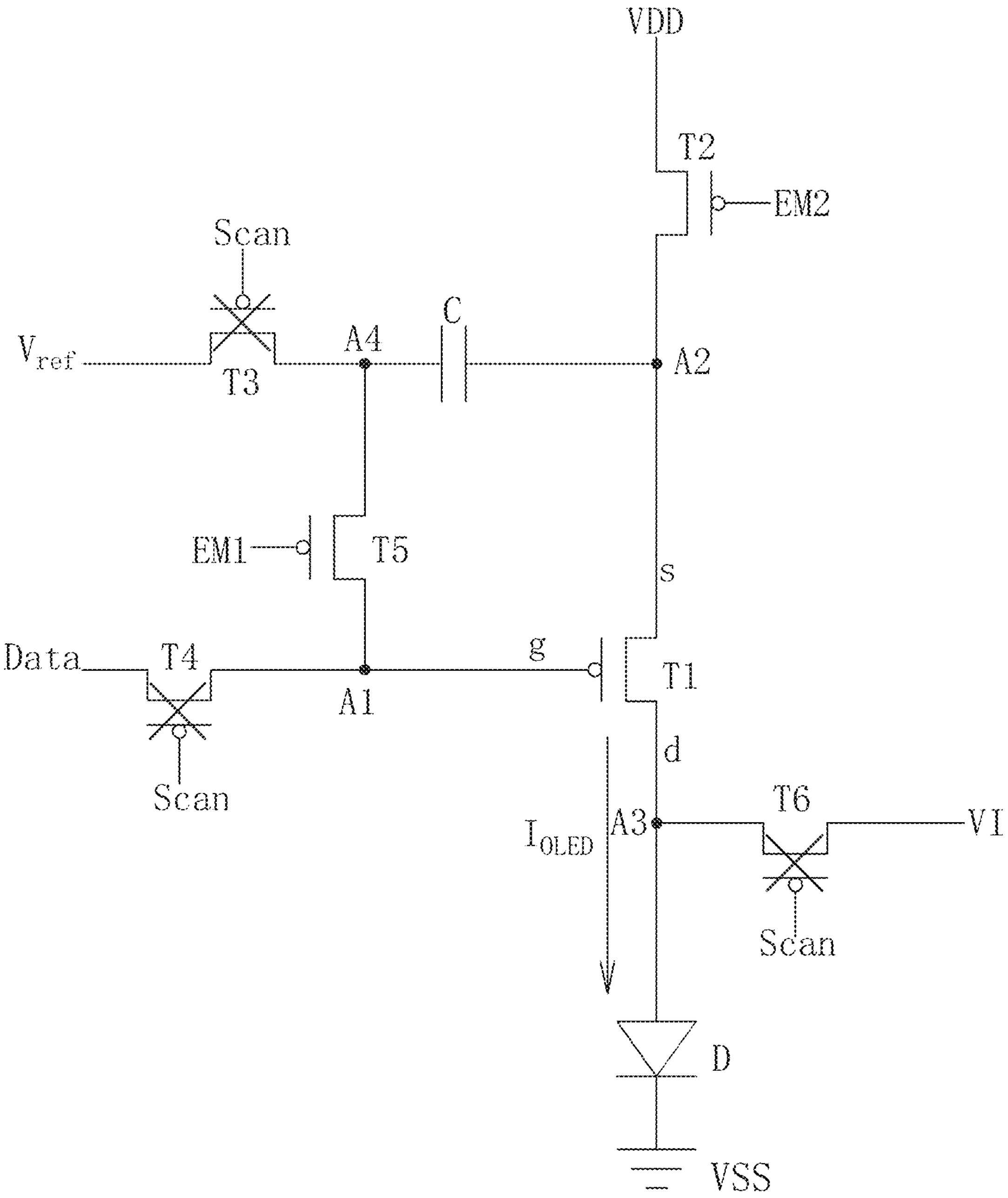
FIG. 8 is a schematic view showing step S3 of the AMOLED pixel driving method provided by the embodiment of the present invention.

Refer to FIG. 5 and FIG. 8. If the first TFT T1, the second TFT T2, the third TFT T3, the fourth TFT T4, the fifth TFT T5, and the sixth TFT T6 are all P-type TFTs, the scan signal Scan provides a high voltage, the first light-emitting control signal EM1 and the second light-emitting control signal EM2 provide a low voltage to control the AMOLED pixel driving circuit to be in a light-emitting phase B3; the second TFT T2 and the fifth TFT T5 are turned on, and the third TFT T3, the fourth TFT T4 and the sixth TFTT6 are all turned off.

As the second TFT T2 is turned on, the voltage level of the other end of the storage capacitor C and the source s of the first TFT T1 becomes a positive power voltage VDD; since the fifth TFT T5 is turned on, one end of the storage capacitor C and the gate g of the first TFT T1 are shorted. As such, the voltage level of one end of the storage capacitor C and the gate g of the first TFT T1 becomes:

$$V_g = VDD + (V_{ref} - (V_{data} + |V_{th}|)) = VDD + V_{ref} - V_{data} - |V_{th}|$$

Wherein, $V_g$ is the voltage level of the gate g of the first TFT T1, VDD is the positive power voltage, and $V_{ref}$ is the reference voltage;

The driving current flows through the OLED D to drive the OLED D to emit light, and the driving current is:

$$\begin{aligned} I_{OLED} &= K \times (V_s - V_g - |V_{th}|)^2 \\ &= K \times (VDD - (VDD + V_{ref} - V_{data} - |V_{th}|) - |V_{th}|)^2 \\ &= K \times (V_{data} - V_{ref})^2 \end{aligned}$$

Wherein, $I_{OLED}$ is the driving current, and K is a current amplification factor of the first TFT T1, i.e., driving TFT, and is determined by the electrical characteristics of the driving TFT.

If the first TFT T1, the second TFT T2, the third TFT T3, the fourth TFT T4, the fifth TFT T5, and the sixth TFT T6 are all N-type TFTs, the scan signal Scan provides a low voltage, the first light-emitting control signal EM1 and the second light-emitting control signal EM2 provide a high voltage to control the AMOLED pixel driving circuit to be in a light-emitting phase B3; the second TFT T2 and the fifth TFT T5 are turned on, and the third TFT T3, the fourth TFT T4 and the sixth TFTT6 are all turned off.

As the second TFT T2 is turned on, the voltage level of the other end of the storage capacitor C and the source s of the first TFT T1 becomes a positive power voltage VDD; since the fifth TFT T5 is turned on, one end of the storage capacitor C and the gate g of the first TFT T1 are shorted. As such, the voltage level of one end of the storage capacitor C and the gate g of the first TFT T1 becomes:

$$V_g=VDD+(V_{ref}-(V_{data}-|V_{th}|))=VDD+V_{ref}-V_{data}+|V_{th}|$$

Wherein, $V_g$ is the voltage level of the gate g of the first TFT T1, VDD is the positive power voltage, and $V_{ref}$ is the reference voltage;

The driving current flows through the OLED D to drive the OLED D to emit light, and the driving current is:

$$\begin{aligned} I_{OLED} &= K\times(V_s-V_g-|V_{th}|)^2 \\ &= K\times(VDD+V_{ref}-V_{data}+|V_{th}|)-VDD-|V_{th}|)^2 \\ &= K\times(V_{data}-V_{ref})^2 \end{aligned}$$

Wherein, $I_{OLED}$ is the driving current, and K is a current amplification factor of the first TFT T1, i.e., driving TFT, and is determined by the electrical characteristics of the driving TFT.

Therefore, the driving current $I_{OLED}$ is independent of the threshold voltage $V_{th}$ of the first TFT T1, i.e., driving TFT, and the positive power voltage VDD, so the AMOLED pixel driving circuit of the present invention can compensate for the threshold voltage $V_{th}$ drift of the driving TFT. In addition, the voltage drop in the positive power voltage VDD can also be compensated, so that the impact of the threshold voltage $V_{th}$ drift of the driving TFT and the voltage drop in the positive power voltage VDD on the driving current $I_{OLED}$ can be eliminated, and the display quality of the AMOLED can be improved.

The present invention further provides a terminal comprising the aforementioned AMOLED pixel driving circuit as shown in FIG. 4 and FIG. 5. The terminal described in the present invention can be implemented in various forms, such as, a mobile phone, a smart phone, a notebook computer, a digital broadcast receiver, a personal digital assistant (PDA), a tablet (PAD), and a portable multimedia player. (PMP), navigation device, and so on, with a communication function. Those skilled in the art should understand that the configuration according to the embodiment of the present invention can also be applied to a fixed type of terminal other than the elements particularly used for mobility purpose, such as, desktop computers, TVs, and so on. The terminal of the present invention may also be a display panel, which may be, but not limited to, an OLED display panel. Since the AMOLED pixel driving circuit can both compensate for the threshold voltage drift of the driving TFT and compensate for the voltage drop in the positive power voltage, the impact of the threshold voltage drift of the driving TFT and the voltage drop in the positive power voltage on the driving current can be eliminated. As a result, the display quality of the terminal of the present invention is high.

In summary, the AMOLED pixel driving circuit and driving method provided by the present invention adopt a 6T1C structure driving circuit. The scan signal, the first light-emitting control signal and the second light-emitting control signal are combined to successively correspond to a reset phase, a compensation phase and a light-emitting phase, so that the driving current flowing through the OLED is independent of the threshold voltage of the driving TFT and the positive power voltage. The invention not only compensates for the threshold voltage drift of the driving TFT but also for the voltage drop in positive power voltage. Therefore, the invention can eliminate the impact of the threshold voltage drift of the driving TFT and voltage drop in the positive power voltage on the driving current, and the display quality of the AMOLED is improved. A terminal provided by the present invention comprises the AMOLED pixel driving circuit capable of compensating for threshold voltage drift of driving TFT and for voltage drop in positive power voltage, thereby eliminating the impact of threshold voltage drift of a driving TFT and voltage drop in positive power voltage on the drive current and showing a higher display quality.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An active matrix organic light-emitting diode (AMOLED) pixel driving circuit, comprising: a first thin film transistor (TFT), a second TFT, a third TFT, a fourth TFT, a fifth TFT, a sixth TFT, a storage capacitor, and an organic light-emitting diode (OLED), wherein the first TFT being a driving TFT;

the first TFT having a gate electrically connected to a first node, a source electrically connected to a second node, and a drain electrically connected to a third node;

the second TFT having a gate receiving a second light-emitting control signal, a source receiving a positive power voltage, and a drain electrically connected to the second node;

the third TFT having a gate receiving a scan signal, a source receiving a reference voltage, and a drain electrically connected to a fourth node;

the fourth TFT having a gate receiving the scan signal, a source receiving a data signal, and a drain electrically connected to the first node;

the fifth TFT having a gate receiving a first light-emitting control signal, a source electrically connected to the fourth node, and a drain electrically connected to the first node;

the sixth TFT having a gate receiving the scan signal, a source receiving a low voltage, and a drain electrically connected to the third node;

the storage capacitor having one end electrically connected to the fourth node and the other electrically connected to the second node;

the OLED having an anode connected to the third node and a cathode receiving a negative power voltage;

the AMOLED pixel driving circuit having a reset phase, a compensation phase and a light-emitting phase;

when the AMOLED pixel driving circuit being in a reset phase, the second TFT, the third TFT, and the fourth TFT and the sixth TFT being turned on, and the fifth TFT being turned off; when the AMOLED pixel driving circuit being in the compensation phase, the third TFT, the fourth TFT, and the sixth TFT being turned on, the second TFT and the fifth TFT being turned off; when the AMOLED pixel driving circuit is in the light-emitting phase, the second TFT and the fifth TFT being turned on, the third TFT, the fourth TFT and the sixth TFT being turned off, wherein the gate of the third TFT, the gate of the fourth TFT, and the gate of the sixth TFT all receive the scan signal that is common to the third TFT, the fourth TFT, and the sixth TFT, such that the third TFT, the fourth TFT, and the sixth TFT are controlled by one same scan signal; and wherein the low voltage supplied to the source of the sixth TFT, the reference voltage supplied to the source of the third TFT, and the data signal supplied to the fourth TFT are different from one another.

2. The AMOLED pixel driving circuit as claimed in claim 1, wherein each TFT is a P-type TFT; during the reset phase, the scan signal and the second light-emitting control signal are at low voltage, and the first light-emitting control signal is at high voltage; during the compensation phase, the scan signal is at low voltage, and the first light-emitting control signal and the second light-emitting control signal are at high voltage; during the light-emitting phase, the scan signal is at high voltage, and the first light-emitting control signal and the second light-emitting control signal are at low voltage.

3. The AMOLED pixel driving circuit as claimed in claim 1, wherein each TFT is an N-type TFT; during the reset phase, the scan signal and the second light-emitting control signal are at high voltage, and the first light-emitting control signal is at low voltage; during the compensation phase, the scan signal is at high voltage, and the first light-emitting control signal and the second light-emitting control signal are at low voltage; during the light-emitting phase, the scan signal is at low voltage, and the first light-emitting control signal and the second light-emitting control signal are at high voltage.

4. The AMOLED pixel driving circuit as claimed in claim 1, wherein the first TFT, the second TFT, the third TFT, the fourth TFT, the fifth TFT and the sixth TFT are all low temperature polycrystalline silicon (LTPS) TFTs, oxide semiconductor TFTs, or amorphous silicon (a-Si) TFTs.

5. An active matrix organic light-emitting diode (AMOLED) pixel driving method, applicable to driving the AMOLED pixel driving circuit as claimed in claim 1, the method comprising:

Step S1: controlling the AMOLED pixel driving circuit to be in a reset phase;

the second TFT, the third TFT, the fourth TFT and the sixth TFT being turned on, and the fifth TFT being turned off;

Step S2: controlling the AMOLED pixel driving circuit to be in a compensation phase;

the third TFT, the fourth TFT and the sixth TFT being turned on, and the second TFT and the fifth TFT being turned off;

Step S3: controlling the AMOLED pixel driving circuit to be in a light-emitting phase;

the second TFT and the fifth TFT being turned on, and the third TFT, the fourth TFT and the sixth TFT being turned off.

6. The AMOLED pixel driving method as claimed in claim 5, wherein each TFT is a P-type TFT; the scan signal and the second light-emitting control signal provide a low voltage, and the first light-emitting control signal provides a high voltage to control the AMOLED pixel driving circuit to be in a reset phase; the scan signal provides a low voltage, and the first light-emitting control signal and the second light-emitting control signal provide a high voltage to control the AMOLED pixel driving circuit to be in a compensation phase; the scan signal provides a high voltage, and the first light-emitting control signal and the second light-emitting control signal provide a low voltage to control the AMOLED pixel driving circuit to be in a light-emitting phase.

7. The AMOLED pixel driving method as claimed in claim 5, wherein each TFT is n N-type TFT; the scan signal and the second light-emitting control signal provide a high voltage, and the first light-emitting control signal provides a low voltage to control the AMOLED pixel driving circuit to be in a reset phase; the scan signal provides a high voltage, and the first light-emitting control signal and the second light-emitting control signal provide a low voltage to control the AMOLED pixel driving circuit to be in a compensation phase; the scan signal provides a low voltage, and the first light-emitting control signal and the second light-emitting control signal provide a high voltage to control the AMOLED pixel driving circuit to be in a light-emitting phase.

8. The AMOLED pixel driving method as claimed in claim 5, wherein the first TFT, the second TFT, the third TFT, the fourth TFT, the fifth TFT and the sixth TFT are all low temperature polycrystalline silicon (LTPS) TFTs, oxide semiconductor TFTs, or amorphous silicon (a-Si) TFTs.

9. A terminal device, comprising the AMOLED pixel driving circuit as claimed in claim 1.

* * * * *